US009889438B2

(12) United States Patent
Yoon et al.

(10) Patent No.: US 9,889,438 B2
(45) Date of Patent: Feb. 13, 2018

(54) ZEOLITE CORE/SILICA ZEOLITE SHELL COMPOSITE, PREPARING METHOD OF THE SAME, AND CATALYST INCLUDING THE SAME

(71) Applicant: Sogang University Research Foundation, Seoul (KR)

(72) Inventors: Kyung Byung Yoon, Seoul (KR); Cao Thanh Tung Pham, Ho Chi Mihn (VN)

(73) Assignee: Sogang University Research Foundation, Seoul (KR)

( * ) Notice: Subject to any disclaimer, the term of this patent is extended or adjusted under 35 U.S.C. 154(b) by 616 days.

(21) Appl. No.: 14/176,743

(22) Filed: Feb. 10, 2014

(65) Prior Publication Data

US 2014/0256538 A1    Sep. 11, 2014

Related U.S. Application Data

(63) Continuation of application No. PCT/KR2012/006400, filed on Aug. 10, 2012.

(30) Foreign Application Priority Data

Aug. 10, 2011 (KR) ........................ 10-2011-0079450

(51) Int. Cl.
| | | |
|---|---|---|
| *B01J 29/80* | (2006.01) | |
| *B01J 29/00* | (2006.01) | |
| *B01J 29/65* | (2006.01) | |
| *B01J 29/70* | (2006.01) | |
| *B01J 29/08* | (2006.01) | |
| *B01J 29/40* | (2006.01) | |
| *B01J 29/50* | (2006.01) | |
| *B01J 29/60* | (2006.01) | |
| *B01J 29/18* | (2006.01) | |
| *C01B 37/02* | (2006.01) | |
| *C01B 39/04* | (2006.01) | |
| *B01J 35/00* | (2006.01) | |
| *B01J 35/02* | (2006.01) | |
| *B01J 37/02* | (2006.01) | |

(52) U.S. Cl.
CPC .............. *B01J 29/80* (2013.01); *B01J 29/00* (2013.01); *B01J 29/005* (2013.01); *B01J 29/08* (2013.01); *B01J 29/18* (2013.01); *B01J 29/40* (2013.01); *B01J 29/50* (2013.01); *B01J 29/60* (2013.01); *B01J 29/65* (2013.01); *B01J 29/70* (2013.01); *B01J 29/7003* (2013.01); *B01J 29/7007* (2013.01); *B01J 29/7011* (2013.01); *B01J 29/7026* (2013.01); *B01J 29/7034* (2013.01); *B01J 35/002* (2013.01); *B01J 35/0073* (2013.01); *B01J 35/023* (2013.01); *C01B 37/02* (2013.01); *C01B 39/04* (2013.01); *B01J 35/0006* (2013.01); *B01J 37/0215* (2013.01); *B01J 2229/12* (2013.01); *B01J 2229/62* (2013.01)

(58) Field of Classification Search
CPC . B01J 29/005; B01J 29/40; B01J 29/18; B01J 29/08; B01J 29/50; B01J 29/60; B01J 29/65; B01J 29/7003; B01J 29/7007; B01J 29/7011; B01J 29/7026; B01J 29/7034; B01J 29/70; B01J 2229/62; B01J 2229/12; B01J 35/002; B01J 35/023; B01J 35/0006; B01J 37/0215; C01B 39/04
USPC ......... 502/4, 60, 67, 69, 527.15; 3/4, 60, 67, 3/69, 527.15
See application file for complete search history.

(56) References Cited

U.S. PATENT DOCUMENTS

| | | | | |
|---|---|---|---|---|
| 4,088,605 | A * | 5/1978 | Rollmann | ................ B01J 29/40 423/705 |
| 4,148,713 | A * | 4/1979 | Rollmann | ................ B01J 29/40 208/111.15 |
| 4,203,869 | A * | 5/1980 | Rollmann | ................ B01J 29/40 423/700 |
| 4,677,239 | A * | 6/1987 | Dewing | ................ C01B 39/026 585/470 |
| 4,788,374 | A * | 11/1988 | Chu | ........................ B01J 29/40 208/46 |
| 4,904,518 | A * | 2/1990 | Mercer | .................... B32B 18/00 428/195.1 |
| 5,888,921 | A * | 3/1999 | Tsang | ..................... B01J 29/005 502/208 |
| 6,013,851 | A * | 1/2000 | Verrelst | .................... B01J 29/04 502/67 |
| 6,773,694 | B1 * | 8/2004 | Lesch | ..................... C01B 37/00 423/306 |

(Continued)

FOREIGN PATENT DOCUMENTS

EP           0697247      9/1999
KR    10-2002-0010143 A    2/2002

(Continued)

OTHER PUBLICATIONS

International Search Report issued in International App. No. PCT/KR2012/006400, dated Feb. 18, 2013.

(Continued)

*Primary Examiner* — Elizabeth D Wood
(74) *Attorney, Agent, or Firm* — Greer, Burns & Crain, Ltd.

(57) ABSTRACT

The present disclosure relates to a preparing method of a zeolite core/silica zeolite shell composite, which includes adding a zeolite seed crystal into a gel solution containing a silicon-source compound, a structure directing agent and a fluorine anion-source compound, and then, crystallizing the gel solution for growing a silica zeolite shell containing a crystal structure which is coherent with that of the zeolite seed crystal; a zeolite core/silica zeolite shell composite prepared by the preparing method above; and catalytic use of the zeolite core/silica zeolite shell composite.

11 Claims, 7 Drawing Sheets

(56) References Cited

U.S. PATENT DOCUMENTS

| | | | | |
|---|---|---|---|---|
| 7,442,365 B1* | 10/2008 | Jacobsen | ............... | B01J 29/06 |
| | | | | 423/305 |
| 2001/0002426 A1* | 5/2001 | Mohr | ................. | B01J 29/80 |
| | | | | 585/407 |
| 2006/0011514 A1* | 1/2006 | van den Berge | ........ | B01J 29/80 |
| | | | | 208/120.01 |
| 2008/0118431 A1* | 5/2008 | Vermeiren | ............ | C01B 37/005 |
| | | | | 423/713 |
| 2011/0201861 A1* | 8/2011 | Bulut | ..................... | B01J 29/40 |
| | | | | 585/446 |

FOREIGN PATENT DOCUMENTS

| | | | |
|---|---|---|---|
| KR | 10-2009-0120846 A | | 11/2009 |
| WO | WO 2009/142408 | * | 11/2009 |

OTHER PUBLICATIONS

Lombard et al., "Synthesis and characterization of core/shell Al-ZSM-5/silicalite-1 zeolite composites prepared in one step"; Microporous and Mesoporous Materials, vol. 129, pp. 220-227; Sep. 24, 2009.

* cited by examiner

US 9,889,438 B2

ZEOLITE CORE/SILICA ZEOLITE SHELL COMPOSITE, PREPARING METHOD OF THE SAME, AND CATALYST INCLUDING THE SAME

CROSS-REFERENCE TO RELATED APPLICATION

This application is a continuation of International Application No. PCT/KR2012/006400 filed on Aug. 10, 2012, claiming the priority based on Korean Patent Application No. 10-2011-0079450 filed on Aug. 10, 2011, the contents of all of which are incorporated herein by reference in their entirety.

TECHNICAL FIELD

The embodiments described herein pertain generally to a zeolite core/silica zeolite shell composite, a preparing method of the zeolite core/silica zeolite shell composite, and a catalyst including the zeolite core/silica zeolite shell composite.

BACKGROUND

A natural or synthetic crystalline micro-porous molecular sieve has been demonstrated to have catalytic properties for various types of hydrocarbon conversion processes. In addition, the crystalline micro-porous molecular sieve has been used as adsorbents and catalyst carriers for various types of hydrocarbon conversion processes and for other purposes. The molecular sieve is a regular porous crystalline material having a limited crystalline structure when measured by X-ray diffraction, and has many small hollows therein, which can be connected to one another by smaller channels or pores. The channels or pores have about the size to allow adsorption of molecules in a specific size while refusing molecules in a large size. An interstitial space or a channel formed by the crystalline network structure enables a molecular sieve such as crystalline silicate, aluminosilicate, crystalline silicoalumino phosphate and crystalline aluminophosphate to be used as a molecular sieve for a separation process and as a catalyst and a catalyst support for a wide variety of hydrocarbon conversion processes.

Within the pores of the crystalline molecular sieve, hydrocarbon conversion reactions such as an isomerization reaction of paraffin, an isomerization reaction of olefin skeleton or double bonding, a disproportionation reaction, an alkylation reaction and a transalkylation reaction of an aromatic compound are controlled by a binding force granted by the channel size of the molecular sieve. Where a fraction of a feedstock is overly large so that it cannot be introduced into and reacted in pores, a problem of reactant selectivity occurs. Where a part of a product cannot leave channels or does not subsequently react, a problem of product selectivity occurs. Product distribution may vary depending on transition state selectivity, and this is because the reaction transition state is so large that it cannot be formed within the pores, and thus, a certain reaction cannot occur. In addition, where a size of the molecules is approximate to a size of the pore system, the problem of the selectivity may be caused from the structural binding to diffusion. A non-selective reaction on a molecular sieve surface, e.g., a non-selective reaction on an acid site of a molecule sieve surface, is not generally desirable, because the reaction is not applied to shape selective binding granted to a reaction occurring within channels of the molecular sieve.

Zeolite is a crystalline micro-porous molecular sieve formed of lattice silica and/or alternatively alumina, which is bounded to a replaceable cation (e.g., an alkali metal or alkali earth metal ion). The term "zeolite" includes a material containing silica and alternatively alumina, but parts of the silica and the alumina are recognized to be wholly or partially substitutable with different oxides. For example, germanium oxide, titanium oxide, tin oxide, phosphorous pen oxide and a mixture thereof may substitute a part of the silica. Boron oxide, iron oxide, gallium oxide, indium oxide and a mixture thereof may substitute a part of the alumina. Accordingly, the terms "zeolite," "zeolites" and "zeolite material" used herein mean not only a material containing a silicon atom and alternatively an aluminum atom within its crystalline lattice structure, but also a material containing substitution elements suitable for the silicon and the aluminum, e.g., gallosilicate, borosilicate, silicoaluminophosphate (SAPO) and aluminophosphate (ALPO). The terms "aluminosilicate zeolite" used herein mean a zeolite material essentially containing a silicon atom and an aluminum atom within its crystalline lattice structure.

In a certain hydrocarbon conversion process, it is sometimes preferable to reform a catalyst used in the process to maximize performance of the catalyst in the certain hydrocarbon conversion process [Korean Patent Application Publication No. 10-2002-0010143, etc.].

For example, it is sometimes preferable that a catalyst used in a hydrocarbon conversion process is a multi-functional catalyst, for example, a tri-functional catalyst or a bi-functional catalyst. The bi-functional catalyst includes two species of individual catalysts, e.g., two species of zeolites having different compositions or structures for inducing individual reactions. A reaction product may be separate, or two species of catalysts may be used together such that a reaction product of one catalyst may be carried on a catalytic site of a second catalyst to be reacted thereon. In addition, one of advantages in using the zeolite catalyst is that the catalyst is shape selective, and a non-selective reaction on a zeolite surface is not generally preferable. Thus, it is sometimes preferable that a catalyst used in a hydrocarbon conversion process has an ability to prevent or at least reduce an inappropriate reaction that may occur on the surface of the zoelite catalyst, by selectively selecting molecules within a supply stream based on their sizes or shapes so as to prevent inappropriate molecules existing in the supply stream from entering onto the zeolite catalyst and reacting with the catalyst. Furthermore, the performance of the zeolite catalyst may be sometimes maximized where the catalyst selectively selects target molecules based on their sizes or shapes to prevent the molecules from being out of the catalyst.

However, when conventional Al-containing zeolite is used as a catalyst for a hydrocarbon conversion reaction, there is a problem in that Al is eluted from the zeolite thereby deteriorating the hydrocarbon reaction. Thus, development of a zeolite structure that can resolve the problem is being demanded.

SUMMARY

Problems to be Solved by the Invention

In view of the foregoing, example embodiments provide a preparing method of a zeolite core/silica zeolite shell composite, which includes growing a silica zeolite shell having a crystal structure which is coherent with that of a zeolite seed crystal, by using a gel solution containing a structure directing agent, a silicon-source compound, and a fluorine anion-source compound, and the zeolite seed crystal.

Furthermore, example embodiments provide a zeolite core/silica zeolite shell composite prepared by the method of the above-described example embodiments and catalytic use thereof.

However, the problems sought to be solved by the present disclosure are not limited to the above description and other problems can be clearly understood by those skilled in the art from the following description.

Means for Solving the Problems

In accordance with one aspect of the present disclosure, there is provided a preparing method of a zeolite core/silica zeolite shell composite, which includes adding a zeolite seed crystal into a gel solution containing a silicon-source compound, a structure directing agent and a fluorine anion-source compound; and crystallizing the gel solution for growing a silica zeolite shell containing a crystal structure which is coherent with that of the zeolite seed crystal.

In accordance with another aspect of the present disclosure, there is provided a zeolite core/silica zeolite shell composite prepared by the preparing method of the above-aspect of the present disclosure, in which a crystal structure of the silica zeolite shell is coherent with that of a crystal structure of the zeolite core.

In accordance with still another aspect of the present disclosure, there is provided a catalyst including the zeolite core/silica zeolite shell composite in accordance with the above-aspect of the present disclosure.

Effect of the Invention

In accordance with the present disclosure, it is possible to provide a preparing method of a zeolite core/silica zeolite shell composite, which includes growing a silica zeolite shell having a crystal structure which is coherent with that of a zeolite seed crystal, by adding the zeolite seed crystal into a gel solution containing a silicon-source compound, a structure directing agent, and a fluorine anion-source compound. If the zeolite core/silica zeolite shell composite prepared by the present disclosure is used as a catalyst, it is possible to resolve the problem occurring when conventional Al-containing zeolite is used as a catalyst for a hydrocarbon conversion reaction, i.e., Al is eluted from the zeolite thereby deteriorating the hydrocarbon reaction.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1A:
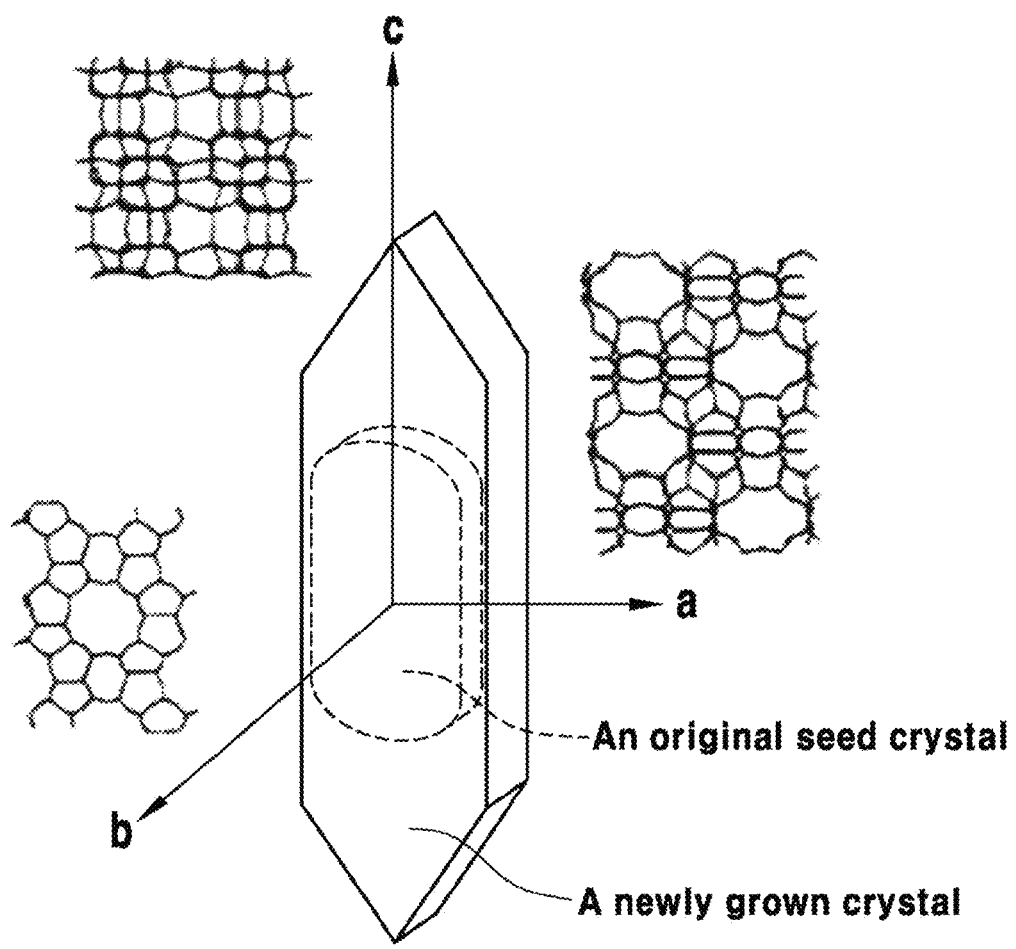
FIG. 1a is a schematic view showing change of a silicalite-1 crystal form after secondary growth on a TEAOH/$(NH_4)_2SiF_6$ gel in accordance with an example embodiment.

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the term "comprises or includes" and/or "comprising or including" used in the document means that one or more other components, steps, operations, and/or the existence or addition of elements are not excluded in addition to the described components, steps, operations and/or elements.

Throughout the whole document, the terms "about or approximately" or "substantially" are intended to have meanings close to numerical values or ranges specified with an allowable error and intended to prevent accurate or absolute numerical values disclosed for understanding of the present invention from being illegally or unfairly used by any unconscionable third party. Through the whole document, the term "step of" does not mean "step for."

Throughout the whole document, the expression "A and/or B" means "A or B, or A and B."

Throughout the whole document, the term "on" that is used to designate a position of one element with respect to another element includes both a case that the one element is adjacent to the another element and a case that any other element exists between these two elements.

Throughout the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Throughout the whole document, the term "alkyl group" includes a linear or branched alkyl group having about 1 to about 22 carbon atoms, about 1 to about 20 carbon atoms, about 1 to about 12 carbon atoms, about 1 to about 10 carbon atoms, or about 1 to about 6 carbon atoms when it is used solely or together with other terms such as "alkoxy," "arylalkyl," "alkanolamine" and "alkoxyamine," unless otherwise defined herein. For example, the alkyl group may include a methyl group, an ethyl group, a propyl group, an isopropyl group, a n-butyl group, a t-butyl group, an isobutyl group, a pentyl group, a hexyl group, an isohexyl group, a heptyl group, a 4,4-dimethylpentyl group, an octyl group, a 2,2,4-trimethylpentyl group, a nonyl group, a decyl group, an undecyl group, a dodecyl group and isomers thereof, but is not limited thereto.

Throughout the whole document, the term "aralkyl group," as a sole group or a part of another group, includes an aromatic ring group bonded by an alkyl group as described above, i.e., an aryl-substituted alkyl group. As non-limiting examples, the aralkyl group is an aralkyl group, in which an aryl group is attached to a linear or branched alkyl group having about 1 to about 22 carbon atoms, about 1 or about 20 carbon atoms, about 1 to about 10 carbon atoms, or about 1 to about 6 carbon atoms. Examples for the aralkyl group may include a benzyl group, a penylethyl group, a phenylpropyl group, a penylbutyl group, a penylpentyl group, a penylhexyl group, a non-penylmethyl group, a non-penylethyl group, a non-penylpropyl group, a non-penylbutyl group, a non-penylpentyl group, a non-penylhexyl group, a naphthyl group and others, but are not limited thereto.

Throughout the whole document, the term "aryl group," as a sole group or a part of another group, includes not only a monocyclic or a non-cyclic aromatic ring group, e.g., a penyl group, a substituted penyl group; but also a jointed group, e.g., a naphthyl group, a phenanthrenyl group, an indenyl group, a tetrahydronaphthyl group and an indenyl group. Accordingly, the aryl group contains one or more ring having 6 or more atoms, 5 or less rings containing 22 or less atoms may exist, and double bonding between neighboring carbon atoms or appropriate heteroatoms may be alternatively (resonance) present. The aryl group may be substituted with one or more including, but limited thereto, halogen, e.g., F, Br, Cl or I; an alkyl group, e.g., a methyl group, an ethyl group or a propyl group; an alkoxy group, e.g., a methoxy group, an ethoxy group, a hydroxy group, a carboxy group, a carbamoyl group, an alkyloxycarbonyl group, a nitro group, an alkenyloxy group, a trifluoromethyl group, an amino group, a cycloalkyl group, an aryl group, a heteroaryl group, a cyano group, an alkyl $S(O)_m$ group (m=0, 1, 2) or a thiol group.

Throughout the whole document, the term "halogen" or "halo" means chlorine, brome, fluorine or iodine.

In accordance with one aspect of the present disclosure, there is provided a preparing method of a zeolite core/silica zeolite shell composite, which includes adding a zeolite seed crystal into a gel solution containing a silicon-source compound, a structure directing agent and a fluorine anion-source compound; and crystallizing the gel solution for growing a silica zeolite shell containing a crystal structure which is coherent with that of the zeolite seed crystal.

In the present example embodiment, the fluorine anion-source compound may include a member selected from the group consisting of HF, $NH_4F$, $(NH_4)_2SiF_6$ and combinations thereof, but is not limited thereto.

In the present example embodiment, the silicon-source compound may include a member selected from the group consisting of tetraethyl orthosilicate (TEOS), fumed silica and combinations thereof, but is not limited thereto.

In the present example embodiment, a molar ratio of the silicon-source compound:the structure directing agent:the fluorine anion-source compound:and water, which are contained in the gel solution, may be about 2 to about 5:about 1.5 to about 2.5:about 0.1 to about 1.5:about 50 to about 100, but is not limited thereto.

In the present example embodiment, in the crystal of the silica zeolite shell, a growth rate of the zeolite seed crystal along the c-axis direction may be faster than a growth rate of the zeolite seed crystal along the a- and b-axis directions, but is not limited thereto.

In the present example embodiment, a growth rate of crystal of the silica zeolite shell may be controlled by a molar ratio of the structure directing agent and the fluorine anion-source compound, but is not limited thereto.

In the present example embodiment, growing the crystal of the silica zeolite shell may be performed at a temperature in a range of from about 100° C. to about 250° C., but is not limited thereto. For example, growing the crystal of the silica zeolite shell may be performed at a temperature in a range of from about 100° C. to about 250° C., from about 120° C. to about 250° C., from about 140° C. to about 250° C., from about 100° C. to about 230° C., from about 100° C. to about 200° C., from about 100° C. to about 180° C., from about 120° C. to about 180° C., or from about 140° C. to about 180° C., but is not limited thereto.

In the present example embodiment, the reaction time may be about 6 hours to about 5 days, but is not limited thereto.

In the present example embodiment, the seed may be about 0.1% to about 10% based on the molar ratio of the silicon source in the gel, but is not limited thereto.

In the present example embodiment, the zeolite seed crystal may include zeolite including Al, but is not limited thereto. For example, the zeolite seed crystal may include a silica zeolite shell selected from the group consisting of ZSM-5, beta-zeolite, MFI, BEA, MOR, FER, FAU, LTL, MFS, MTW, OFF, GME, LTA, MAZ, MEI and MEL, but is not limited thereto.

In the present example embodiment, the silica zeolite shell may include a silica zeolite shell selected from the group consisting of a silicalite-1 shell, a silica BEA shell, a silica MOR shell, a silica FER shell, a silica FAU shell, a silica LTL shell, a silica MFS shell, a silica MTW shell, a silica OFF shell, a silica GME shell, a silica LTA shell, a silica MAZ shell, a silica MEI shell and a silica MEL shell, but is not limited thereto.

In the present example embodiment, the zeolite core/silica zeolite shell composite may include a member selected from the group consisting of a ZSM-5/silicalite-1 shell, a beta-zeolite/silicalite-1 shell, an aluminosilicate BEA core/silica BEA shell, an aluminosilicate MOR core/silica MOR shell, an aluminosilicate FER core/silica FER shell, an aluminosilicate FAU core/silica FAU shell, an aluminosilicate LTL core/silica LTL shell, an aluminosilicate MFS core/silica MFS shell, an aluminosilicate MTW core/silica MTW shell, an aluminosilicate OFF core/silica OFF shell, an aluminosilicate GME core/silica GME shell, an aluminosilicate LTA core/silica LTA shell, an aluminosilicate MAZ core/silica MAZ shell, an aluminosilicate MEI core/silica MEI shell and an aluminosilicate MEL core/silica MEL shell, but is not limited thereto.

In the present example embodiment, for the structure directing agent, any structure directing agent commonly used in the art of the present disclosure may be used without limitation. For example, for the structure directing agent, an organic structure directing agent may be used, and in general, a compound containing a nitrogen-containing organic cation may be used.

In the present example embodiment, the structure directing agent may include a member selected from the group consisting of alkylamine, alkanolamine, alkoxyamine, an ammonium salt represented by following Chemical Formula 1 and combinations thereof, but is not limited thereto:

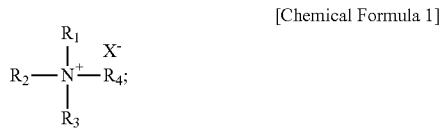

[Chemical Formula 1]

In Chemical Formula 1 above, $R_1$ to $R_4$ each independently indicates hydrogen, a halogen element, an alkyl group of $C_1$ to $C_{22}$, an alkoxy group of $C_1$ to $C_{22}$, an aralkyl group or an aryl group, and $R_1$ to $R_4$ may include at least one oxygen, nitrogen, sulfur or metal element; and $X^-$ indicates a counter anion.

Non-limiting examples for the $X^-$ counter anion may include a halide anion, a hydroxide anion, a sulfate anion, an acetate anion or a carboxylate anion, but is not limited thereto.

In the present example embodiment, the alkylamine may include primary alkylamine, secondary alkylamine or tertiary alkylamine, and the alkyl group contained in the alkylamine may be a linear or branched alkyl group having about 1 to about 20 carbons, or about 1 to about 12 carbons, but is not limited thereto.

In the present example embodiment, the alkanolamine may include primary alkanolamine, secondary alkanolamine or tertiary alkanolamine, and the alkoxyamine may include primary alkoxyamine, secondary alkoxyamine or tertiary alkoxyamine, but is not limited thereto.

In another example embodiment, the alkyl group or the alkylene group contained in the alkanolamine and the alkoxyamine may be a linear or branched alkyl group or alkylene group having about 1 to about 20 carbons or about 1 to about 12 carbons, but is not limited thereto.

As non-limiting examples for the structure directing agent, there is aliphatic or cycloaliphatic amine containing 8 or less carbon atoms. Specifically, there are propylamine, ispropylamine, isobutylamine, n-butylamine, piperidine, 4-methylpiperidine, cyclopentylamine, cyclohexylamine, 1,1,3,3-tetramethyl-butylamine, cyclopentylamine, and others. For example, there are diisobutylamine, trimethylamine, diisopropylamine, sec-butylamine, 2,5-dimethylpyrrolidine, 2,6-dimethylpiperidine and others, but the structure directing agent is not limited thereto.

In the present example embodiment, the structure directing agent may include a member selected from the group consisting of tetramethylammoniumhydroxide (TMAOH), tetraethylammoniumhydroxide (TEAOH), tetrapropylammoniumhydroxide (TPAOH), tetrabutylammoniumhydroxide (TBAOH) and combinations thereof, but is not limited hereto.

In accordance with another aspect of the present disclosure, there is provided a zeolite core/silica zeolite shell composite prepared by the preparing method of the present disclosure, in which a crystal structure of the silica zeolite shell is coherent with a crystal structure of the zeolite core.

In the present example embodiment, the zeolite core/silica zeolite shell composite may include a member selected from the group consisting of an aluminosilicate BEA core/silica BEA shell, an aluminosilicate MOR core/silica MOR shell, an aluminosilicate FER core/silica FER shell, an aluminosilicate FAU core/silica FAU shell, an aluminosilicate LTL core/silica LTL shell, an aluminosilicate MFS core/silica MFS shell, an aluminosilicate MTW core/silica MTW shell, an aluminosilicate OFF core/silica OFF shell, an aluminosilicate GME core/silica GME shell, an aluminosilicate LTA core/silica LTA shell, an aluminosilicate MAZ core/silica MAZ shell, an aluminosilicate MEI core/silica MEI shell and an aluminosilicate MEL core/silica MEL shell, but is not limited hereto.

In accordance with still another aspect of the present disclosure, there is provided a catalyst including the zeolite core/silica zeolite shell composite in accordance with the present disclosure.

In the present example embodiment, the catalyst may further include a catalyst activity metal, but is not limited thereto.

In the present example embodiment, the catalyst may be used for a hydrocarbon conversion reaction, but is not limited thereto.

In the present example embodiment, the hydrocarbon conversion reaction may include a member selected from the group consisting of a hydrocarbon decomposition reaction, an isomerization of an alkyl aromatic compound, a disproportionation reaction of toluene, a transalkylation of an aromatic compound, an alkylation reaction of an aromatic compound, a reforming from naphtha to an aromatic compound, a conversion from a paraffin and/or olefin to an aromatic compound, a disproportionation reaction from naphtha to a lower olefin, and a dewaxing of a hydrocarbon, but is not limited thereto.

Hereinafter, the example embodiments are described in detail by using Examples, but are not limited to the Examples.

Examples

Gel containing TEOS, TEAOH, $(NH_4)_2SiF_6$ and $H_2O$ (secondary distillated water, DDW) was prepared, and in the gel, a molar ratio of TEOS:TEAOH:$(NH_4)_2SiF_6$:$H_2O$ was 4.00:1.92:0.36:78.40. The gel was prepared as follows.

(I) Preparation of a TEOS/TEAOH Solution (Solution I):

TEAOH (35%—Alfa aesar, 20.2 g) and DDW (22.2 g) were added in turn to a plastic beaker containing TEOS (98%—Acros, 31.8 g). The beaker containing the solution was tightly covered with plastic wrap, and magnetically stirred for about 30 minutes until the solution was transparent.

(II) Preparation of a TEAOH/$(NH_4)_2SiF_6$ Solution (Solution II):

TEAOH (35%—Alfa aesar, 10.1 g), $(NH_4)_2SiF_6$ (98%—Aldrich, 2.45 g) and DDW (11.1 g) were injected into a plastic beaker, and stirred until $(NH_4)_2SiF_6$ was completely dissolved. Solution II was poured rapidly into Solution I under strong stirring. The mixture was solidificated immediately. The solidificated mixture was further stirred by using a plastic rod for 2 minutes, and aged for 6 hours under a static atmosphere. After the aging, 0.36 g of MFI powder was added. The semisolid gel having the MFI seed was crushed by using a food blender, and transited into tefron-connected autoclave. The sealed autoclave was placed in an oven warmed up to a desired temperature. After desired time lapsed, the autoclave was removed from the oven, and tap water flowed over the oven for rapid cooling. The solid product was removed from the autoclave, and washed with DDW through centrifugation until the product became neutral. The washed solid powder was dried in a common oven at 120° C. for 12 hours. The product was calcined in the air at 550° C. for 20 hours to remove a template.

Characteristics of the obtained product were analyzed and provided in FIG. 1a to FIG. 6.

Figure 1B:
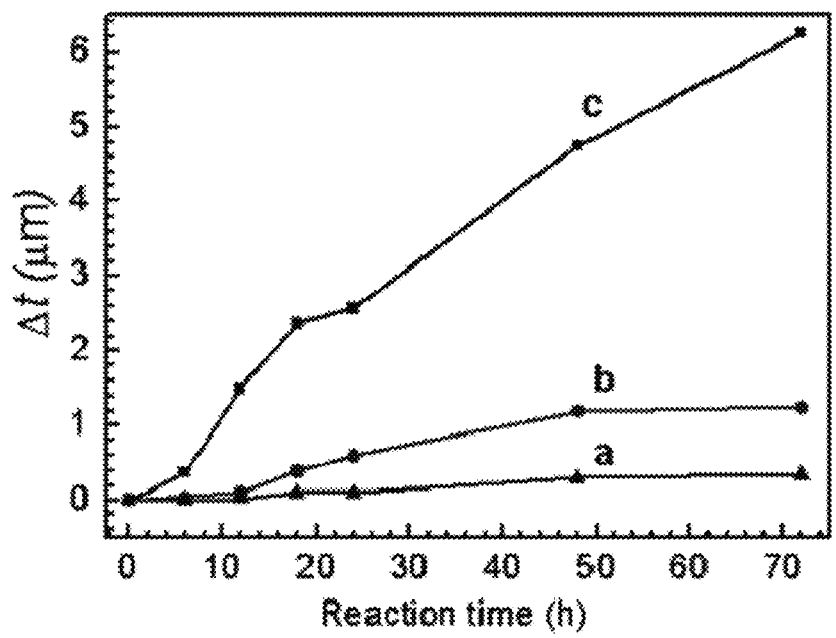
FIG. 1b is a graph showing a plot of a silicalite-1 shell thickness to reaction time during secondary growth on a TEAOH/$(NH_4)_2SiF_6$ gel along three (3) main axes a, b and c in accordance with an example embodiment.

FIG. 1a is a schematic view showing change of a silicalite-1 crystal form after secondary growth on a TEAOH/$(NH_4)_2SiF_6$ gel in accordance with an example embodiment; and FIG. 1b is a graph showing a plot of a thickness of silicalite-1 shell crystal to reaction time during secondary growth on a TEAOH/$(NH_4)_2SiF_6$ gel along three (3) main axes a, b and c in accordance with an example embodiment.

Figure 2:
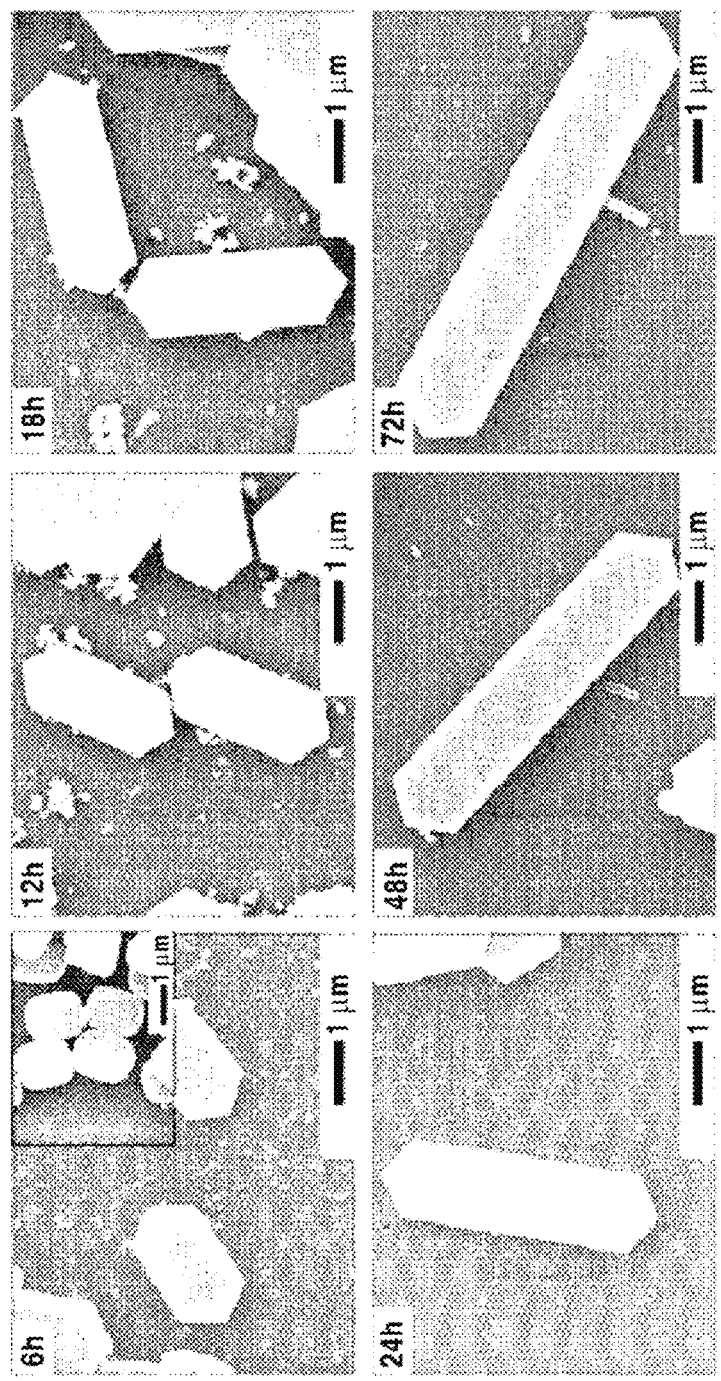
FIG. 2 shows scanning electron microscopy (SEM) photographs of a silicalite-1 crystal after secondary growth on a TEAOH/$(NH_4)_2SiF_6$ gel at 165° C. depending on different reaction time in accordance with an example embodiment.

FIG. 2 shows scanning electron microscopy (SEM) photographs of a silicalite-1 crystal after secondary growth on a TEAOH/$(NH_4)_2SiF_6$ gel at 165° C. depending on different reaction time in accordance with an example embodiment.

Figure 3:
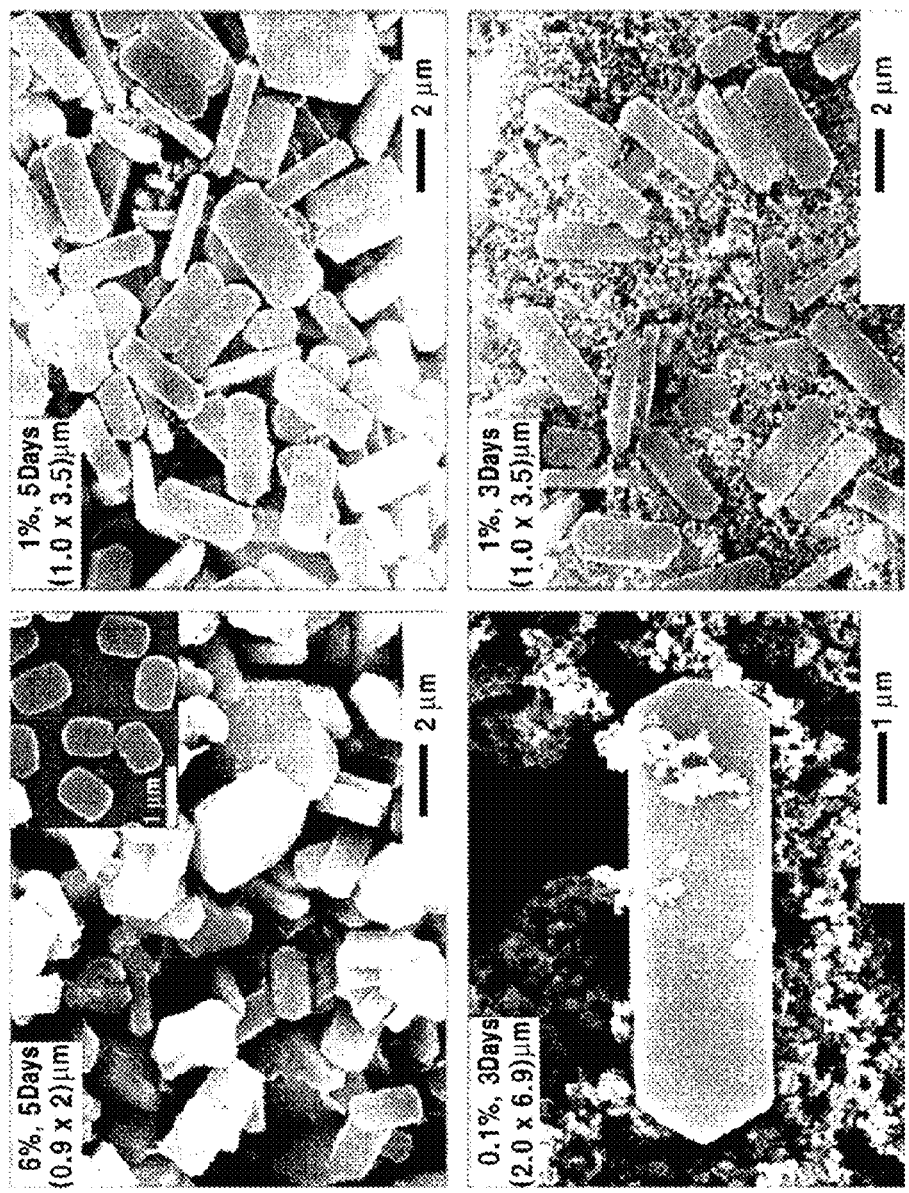
FIG. 3 shows SEM photographs of silicalite-1 crystals after secondary growth at 165° C. using TEAOH/$(NH_4)_2SiF_6$ gels having different seed concentrations in accordance with an example embodiment.

FIG. 3 shows SEM photographs of silicalite-1 crystals after secondary growth at 165° C. using TEAOH/$(NH_4)_2SiF_6$ gels having different seed concentrations in accordance with an example embodiment.

Figure 4:
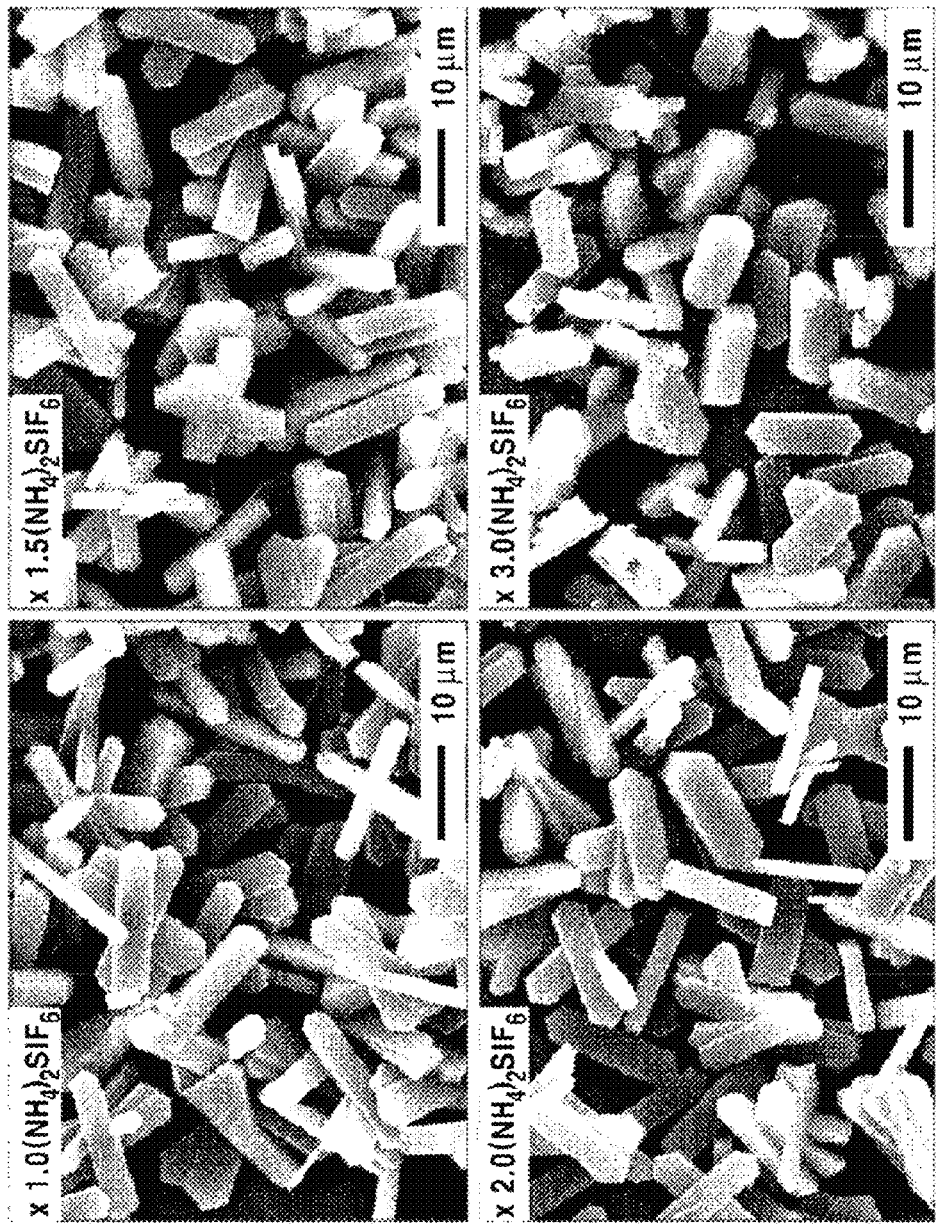
FIG. 4 shows SEM photographs showing silicalite-1 powders prepared by secondary growth of TEAOH/$(NH_4)_2SiF_6$ gels having different amounts of $(NH_4)_2SiF_6$ in accordance with an example embodiment (temperature=150° C., reacted for 7 days)

FIG. 4 shows SEM photographs showing silicalite-1 powders prepared by secondary growth of TEAOH/$(NH_4)_2SiF_6$ gels having different amounts of $(NH_4)_2SiF_6$ in accordance with an example embodiment (temperature=150° C., reacted for 7 days).

Figure 5:
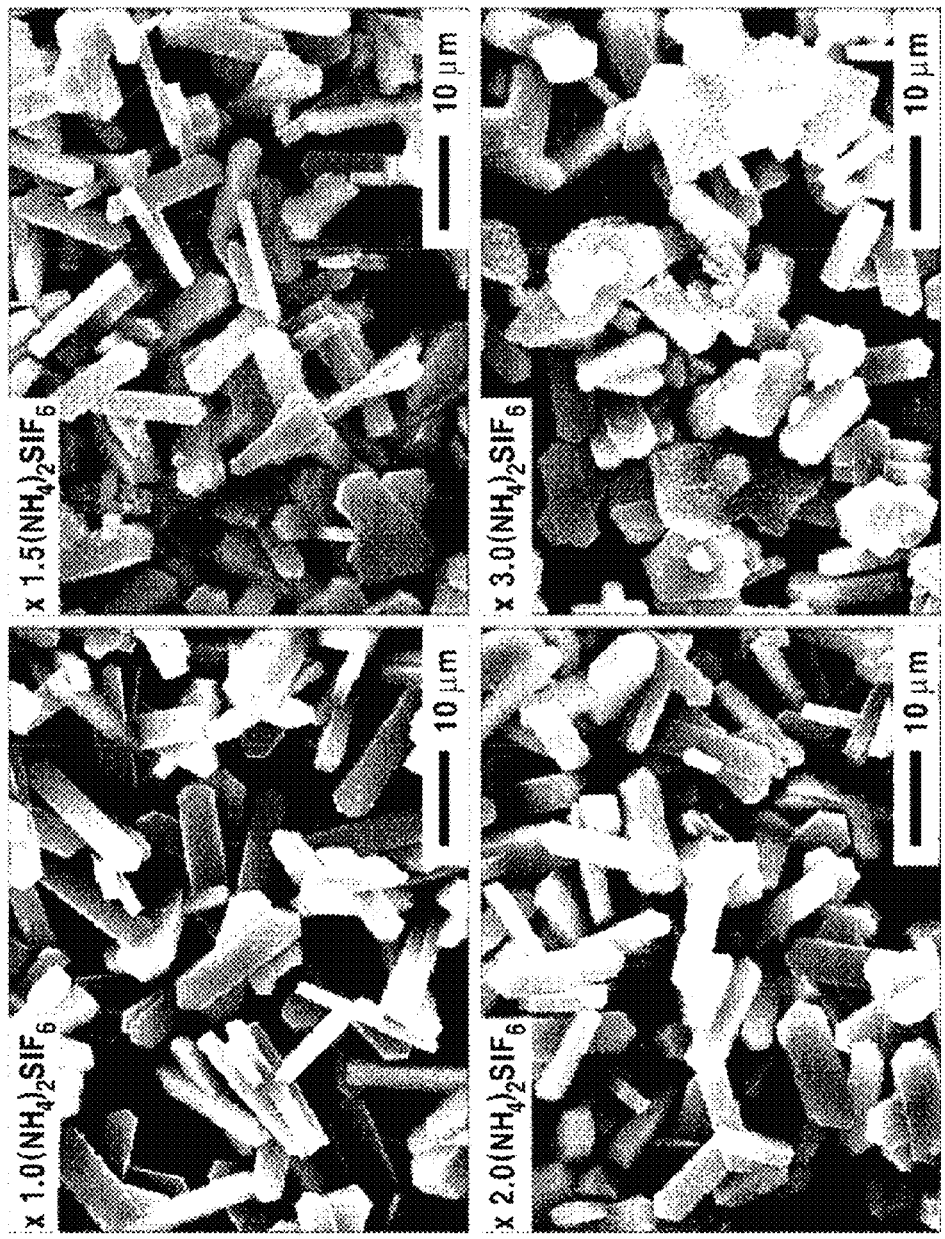
FIG. 5 shows SEM photographs of silicalite-1 powders prepared by secondary growth of TEAOH/$(NH_4)_2SiF_6$ gels having different amounts of $(NH_4)_2SiF_6$ in accordance with an example embodiment (temperature=165° C., reacted for 7 days)

FIG. 5 shows SEM photographs of silicalite-1 powders prepared by secondary growth of TEAOH/$(NH_4)_2SiF_6$ gels having different amounts of $(NH_4)_2SiF_6$ in accordance with an example embodiment (temperature=165° C., reacted for 7 days).

Figure 6:
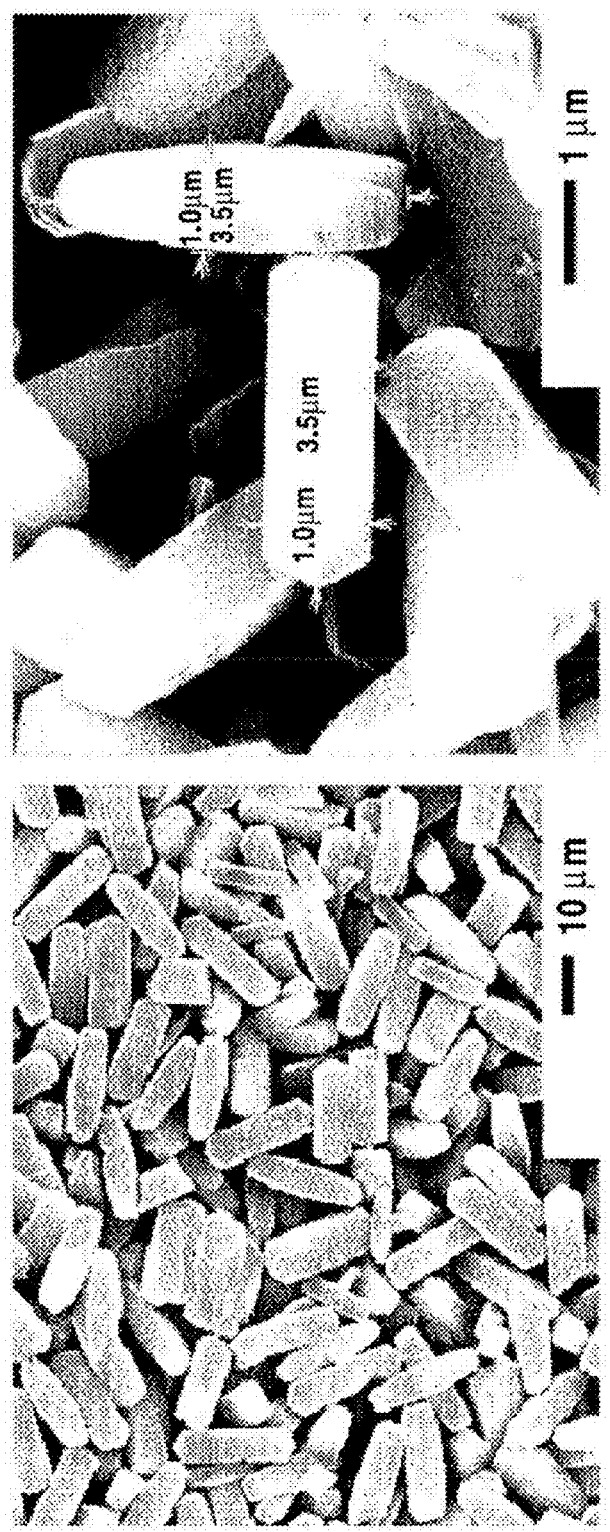
FIG. 6 shows SEM photographs of a silicalite-1 crystal after secondary growth on a TEAOH/$(NH_4)_2SiF_6$ gel at 150° C. using fume silica as a silica source in accordance with an example embodiment.

FIG. 6 shows SEM photographs of a silicalite-1 crystal after secondary growth on a TEAOH/$(NH_4)_2SiF_6$ gel at 150° C. using fume silica as a silica source in accordance with an example embodiment.

We claim:

1. A preparing method of a zeolite core/silica zeolite shell composite, comprising:
   mixing a silicon-source compound, a structure directing agent, and a fluorine anion-source compound to provide a gel;
   aging the gel;
   adding a zeolite seed crystal into the gel after the gel has been aged; and,
   crystallizing the gel for growing a silica zeolite shell containing a crystal structure which is coherent with that of the zeolite seed crystal,
   wherein an amount of the zeolite seed crystal is 0.1% to 10% of moles of the silicon-source compound in the gel,
   wherein in a crystal of the silica zeolite shell, a growth rate of the zeolite seed crystal along its c-axis direction is faster than growth rates of the zeolite seed crystal along its a- and b-axis directions, and,
   wherein the growth rates of the crystal of the silica zeolite shell are controlled by a molar ratio of the structure directing agent and the fluorine anion-source compound.

2. The preparing method of a zeolite core/silica zeolite shell composite of claim 1, wherein the fluorine anion-source compound includes a member selected from the group consisting of HF, NH4F, (NH4)2SiF6, and combinations thereof.

3. The preparing method of a zeolite core/silica zeolite shell composite of claim 1, wherein a molar ratio of the silicon-source compound:the structure directing agent:the fluorine anion-source compound:water, which are contained in the gel solution, is about 2 to about 5:about 1.5 to about 2.5:about 0.1 to about 1.5:about 50 to about 100.

4. The preparing method of a zeolite core/silica zeolite shell composite of claim 1, wherein growing the crystal of the silica zeolite shell is performed at a temperature in a range of from about 100° C. to about 250° C.

5. The preparing method of a zeolite core/silica zeolite shell composite of claim 1, wherein the zeolite seed crystal includes a zeolite including Al.

6. The preparing method of a zeolite core/silica zeolite shell composite of claim 1, wherein the zeolite seed crystal includes a zeolite crystal selected from the group consisting of ZSM-5, beta-zeolite, MFI, BEA, MOR, FER, FAU, LTL, MFS, MTW, OFF, GME, LTA, MAZ, MEI, and MEL.

7. The preparing method of a zeolite core/silica zeolite shell composite of claim 1, wherein the silica zeolite shell includes a silica zeolite shell selected from the group consisting of silicalite-1 shell, silica BEA shell, silica MOR shell, silica FER shell, silica FAU shell, silica LTL shell, silica MFS shell, silica MTW shell, silica OFF shell, silica GME shell, silica LTA shell, silica MAZ shell, silica MEI shell, and silica MEL shell.

8. The preparing method of a zeolite core/silica zeolite shell composite of claim 1, wherein the zeolite core/silica zeolite shell composite includes a member selected from the group consisting of ZSM-5/silicalite-1 shell, beta-zeolite/silicalite-1 shell, aluminosilicate BEA core/silica BEA shell, aluminosilicate MOR core/silica MOR shell, aluminosilicate FER core/silica FER shell, aluminosilicate FAU core/silica FAU shell, aluminosilicate LTL core/silica LTL shell, aluminosilicate MFS core/silica MFS shell, aluminosilicate MTW core/silica MTW shell, aluminosilicate OFF core/silica OFF shell, aluminosilicate GME core/silica GME shell, aluminosilicate LTA core/silica LTA shell, aluminosilicate MAZ core/silica MAZ shell, aluminosilicate MEI core/silica MEI shell, and aluminosilicate MEL core/silica MEL shell.

9. The preparing method of a zeolite core/silica zeolite shell composite of claim 1, wherein the structure directing agent includes a member selected from the group consisting of alkylamine, alkanolamine, alkoxyamine, an ammonium salt represented by the following Chemical Formula 1, and combinations thereof:

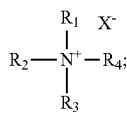

[Chemical Formula 1]

in the Chemical Formula 1,
each of R1 to R4 independently represents H, a halogen, a C1-22 alkyl group, a C1-22 alkoxy group, an aralkyl group, or an aryl group, and R1 to R4 may include at least one oxygen, nitrogen, sulfur or metal element; and
X− represents a counter anion.

10. The preparing method of a zeolite core/silica zeolite shell composite of claim 9, wherein the alkylamine includes a primary alkylamine, a secondary alkylamine or a tertiary alkylamine; the alkanolamine includes a primary alkanolamine, a secondary alkanolamine or a tertiary alkanolamine; the alkoxyamine includes a primary alkoxyamine, a secondary alkoxyamine or a tertiary alkoxyamine; an alkyl group or alkylene group contained in each of the alkylamine, the alkanolamine and the alkoxyamine is a linear form or branched form having 1 to 20 carbons.

11. A preparing method of a zeolite core/silica zeolite shell composite, comprising:

mixing a silicon-source compound, a structure directing agent, and a fluorine anion-source to provide a solution;

solidifying the solution to provide a gel;

aging the gel;

adding a zeolite seed crystal into the gel after the gel has been aged; and, then crystallizing the gel for growing a silica zeolite shell containing a crystal structure which is coherent with that of the zeolite seed crystal, wherein an amount of the zeolite seed crystal is 0.1% to 10% of moles of the silicon-source compound in the gel, wherein in a crystal of the silica zeolite shell, a growth rate of the zeolite seed crystal along its c-axis direction is faster than growth rates of the zeolite seed crystal along its a- and b-axis directions, and, wherein the growth rates of the crystal of the silica zeolite shell are controlled by a molar ratio of the structure directing agent and the fluorine anion-source compound.

* * * * *